United States Patent
Ngan et al.

(10) Patent No.: US 7,296,356 B2
(45) Date of Patent: Nov. 20, 2007

(54) TOOLLESS ADJUSTABLE BASE FOR A PORTABLE SAW

(75) Inventors: On Shan Ngan, DongGuan (CN); Hei Pang Wong, DongGuan (CN)

(73) Assignee: Eastway Fair Company Limited, Tortola (VG)

( * ) Notice: Subject to any disclaimer, the term of this patent is extended or adjusted under 35 U.S.C. 154(b) by 374 days.

(21) Appl. No.: 10/823,873

(22) Filed: Apr. 14, 2004

(65) Prior Publication Data

US 2005/0229408 A1 Oct. 20, 2005

(51) Int. Cl.
*B23D 51/02* (2006.01)
*B23D 51/00* (2006.01)

(52) U.S. Cl. .......................... 30/376; 30/392

(58) Field of Classification Search ................. 30/374, 30/375, 376, 392; 408/116, 153, 161, 163, 408/167, 187
See application file for complete search history.

(56) References Cited

U.S. PATENT DOCUMENTS

| | | | |
|---|---|---|---|
| 1,102,792 A | | 7/1914 | Patton |
| 2,695,522 A | | 11/1954 | Papworth |
| 2,931,402 A | | 4/1960 | Papworth |
| 2,949,944 A | | 8/1960 | Blachly |
| 3,087,519 A | * | 4/1963 | McCarty et al. ............. 30/376 |
| 3,339,598 A | | 9/1967 | Frostad |
| 3,938,251 A | | 2/1976 | Kareman |
| 4,221,051 A | * | 9/1980 | Glass ........................... 30/377 |
| 4,262,421 A | | 4/1981 | Bergler et al. |
| 4,730,397 A | | 3/1988 | Weiford et al. |
| 5,012,583 A | | 5/1991 | Blöchle et al. |
| 5,414,935 A | | 5/1995 | Braunbach et al. |
| 5,617,638 A | | 4/1997 | Amano et al. |
| 5,644,845 A | | 7/1997 | Dürr et al. |
| 5,727,322 A | | 3/1998 | Giacometti |
| 5,778,538 A | * | 7/1998 | Gentinetta et al. ............ 30/124 |
| 5,819,421 A | | 10/1998 | Giacometti et al. |
| 6,357,124 B1 | | 3/2002 | Wall et al. |
| 6,553,675 B2 | * | 4/2003 | Orrico ......................... 30/376 |
| 2002/0095798 A1 | | 7/2002 | Ellis et al. |
| 2004/0163263 A1 | * | 8/2004 | Wadge ........................ 30/376 |
| 2004/0168561 A1 | * | 9/2004 | Tam et al. .................... 83/747 |

OTHER PUBLICATIONS

Operator's Manual, RIDGID, Orbital Jig Saw, Model No. R3120, Variable Speed, May 2003, 20 pages.
Parts List, RIDGID, R3120, May 26, 2003, 1 page.

* cited by examiner

*Primary Examiner*—Boyer D. Ashley
*Assistant Examiner*—Edward Landrum
(74) *Attorney, Agent, or Firm*—Brinks Hofer Gilson & Lione; G. Peter Nichols

(57) ABSTRACT

The present invention discloses an adjustable base for a portable saw and a portable saw therefore. The base includes a longitudinal shell secured to the housing, and mounted to a baseplate. A shaft is mounted to the housing extending through a slot formed in the shell. A collar is connected to the shaft and has a first cam surface cooperating with a corresponding second cam surface of the housing. Rotation of the collar in an unlocked direction extends the shaft away from the housing. A clamp member is received within a shell inner region and cooperates with the shaft. The shaft is threadably engaged to one of the collar, the housing or the clamp member so that rotation of the collar in the unlocked direction either extends the shaft further away from the housing or extends the clamp member along the shaft away from the housing.

19 Claims, 6 Drawing Sheets

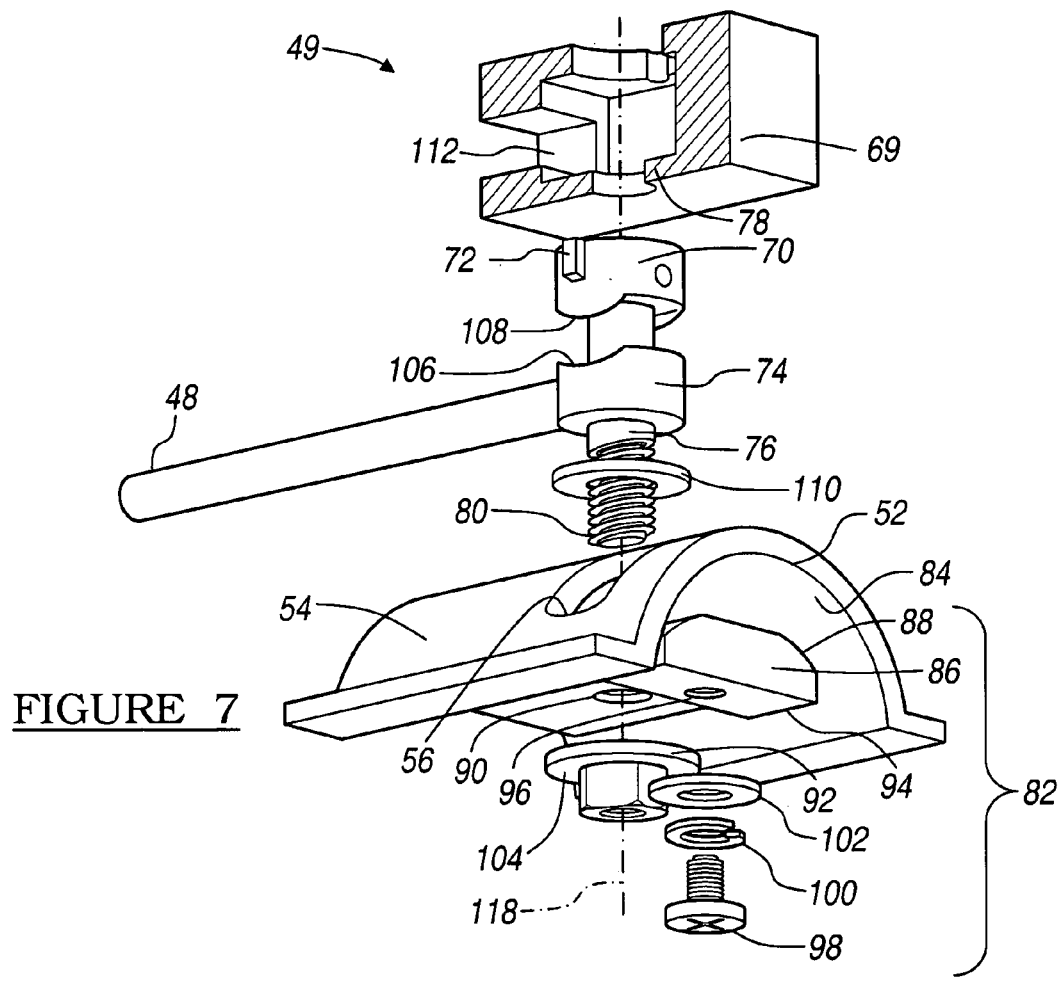
FIGURE 7
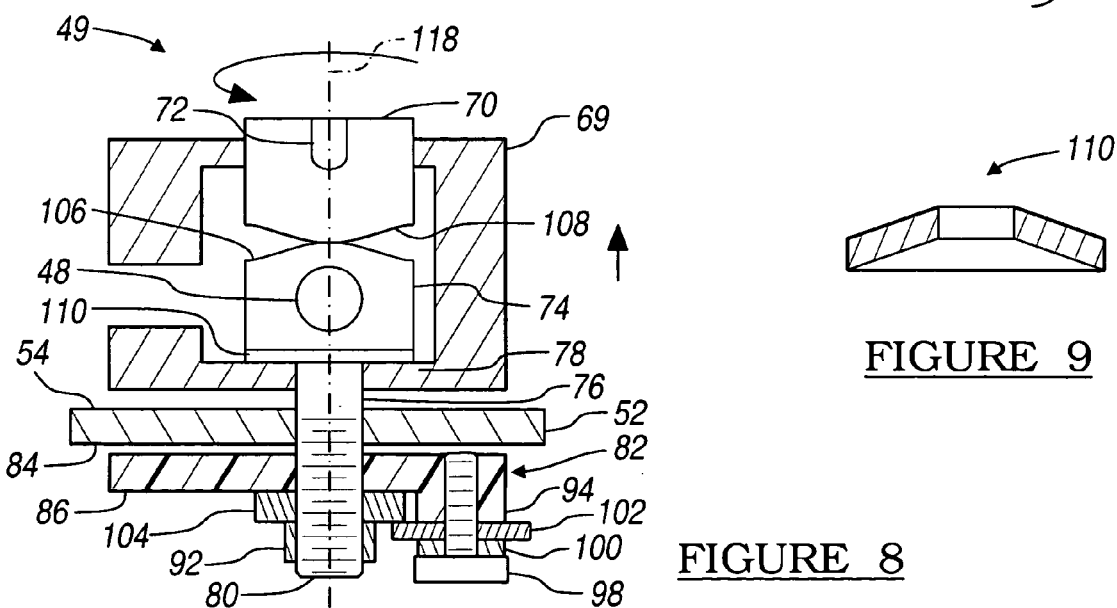
FIGURE 9
FIGURE 8

TOOLLESS ADJUSTABLE BASE FOR A PORTABLE SAW

BACKGROUND OF THE INVENTION

1. Field of the Invention

The invention relates generally to a portable power tool, particularly to an adjustable base therefore.

2. Background Art

Conventional portable saws typically include a planar base upon which the tool is supported during the cutting operation to provide a consistent angle of cut relative to a top surface of an associated workpiece. Many conventional prior art portable saws are provided with an adjustable base for permitting a user to select an angle of the base relative to the cutting plane of the portable saw to thereby provide a user selected cutting angle relative to the surface of the workpiece. This angular adjustment of the cutting plane relative to the workpiece is commonly referred to as the bevel angle and is measured as the offset from orthogonal to the workpiece.

Some conventional prior art portable saws with adjustable bases include a fastener, such as a threaded screw or bolt that must be loosened so that the base may be adjusted and tightened to secure the orientation of the base. However, the use of a fastener may require utilization of a separate tool which may be inconvenient to a user. Alternatively, prior art adjustable bases may include a threaded fastener with a knob formed thereon, yet compactness may limit the size of the knob thus limiting the torque that may be applied by the user which may result in a non-secure attachment of the base to the power tool.

Accordingly, the prior art has provided selective adjustment of the base to the portable saw by use of a threaded fastener that is tightened and loosened by utilization of an elongate lever extending from the fastener or a nut that is threadably engaged to the fastener. Due to the length of the lever, limited rotary displacement of the lever may be permitted because of compactness of the tool or size restraints. Accordingly, such prior art adjustable bases that utilize a threaded member typically permit less than a half turn of the lever thus limiting the range of torque provided to secure the base to the tool and/or limiting the amount of clearance provided to adjust the base relative to the tool.

Accordingly, the prior art teaches adjustable bases that utilize a toolless clamping mechanism with a lever mounted to a double threaded fastener with the threads in opposed directions, to provide twice the displacement per angular rotation in the limited range of manual rotation. The prior art also provides a threaded engagement that has an unlimited range of manual rotation, yet requiring additional effort by the user. Other prior art toolless adjustable bases have avoided the attachment by a threaded member altogether by utilizing an offset lobe clamp member. Some offset lobe clamp member designs may be inconvenient to the user, by requiring removal of a baseplate from the adjustable base before the lever can be fully rotated to the unlock position.

A goal of the present invention is to provide a toolless adjustable base for a portable saw that is convenient to a user by providing both sufficient clearance to adjust the base and sufficient torque to reattach the base relative to the tool while minimizing the effort and the range of motion required by the user.

SUMMARY OF THE INVENTION

An aspect of the invention is to provide an adjustable base for a portable saw having a housing, a handle affixed to the housing, a motor oriented in the housing, and a saw blade operably driven by the motor for performing a cutting operation. The adjustable base includes a longitudinal cylindrical shell secured to the housing. The shell has a longitudinal axis that is generally parallel with a cutting plane of the saw blade and the shell has a transverse slot formed therethrough. A baseplate is affixed to the shell for engaging a workpiece and supporting the saw thereon. A shaft is mounted to the housing for limited rotary and axial movement relative to the housing, and the shaft has a distal end extending from the housing, through the transverse slot and into an inner region of the shell. A collar is operably connected to the shaft and has a first cam surface cooperating with a corresponding second cam surface of the housing. Rotation of the collar in an unlocked direction extends the distal end of the shaft away from the housing, and rotation of the shaft in a locked direction retracts the distal end of the shaft towards the housing due to the cooperating cam surfaces. A longitudinal clamp member is received within the shell inner region and cooperates with the shaft distal end so that the shell inner region can pivot about the clamp member as the transverse slot provides clearance for the shaft. The shaft is threadably engaged to one of the collar, the housing or the clamp member so that rotation of the collar in the unlocked direction either extends the shaft further away from the housing or extends the clamp member along the shaft away from the housing for permitting the shell to be loosened for adjustment. Rotation of the collar in the locked direction either retracts the shaft towards the housing or retracts the clamp member along the shaft towards the housing for securing the shell relative to the housing.

The above aspects and other aspects, objects, features and advantages of the present invention are readily apparent from the following detailed description of the best mode for carrying out the invention when taken in connection with the accompanying drawings.

BRIEF DESCRIPTION OF THE DRAWINGS

FIG. 7 is an exploded perspective view of the clamping mechanism of FIG. 6;

FIG. 8 is a side partial section view of the clamping mechanism of FIG. 6, illustrated in the unlocked position;

FIG. 9 is a cross section view of a biasing member of the clamping mechanism of FIG. 6;

DETAILED DESCRIPTION OF THE PREFERRED EMBODIMENT(S)

Figure 1:
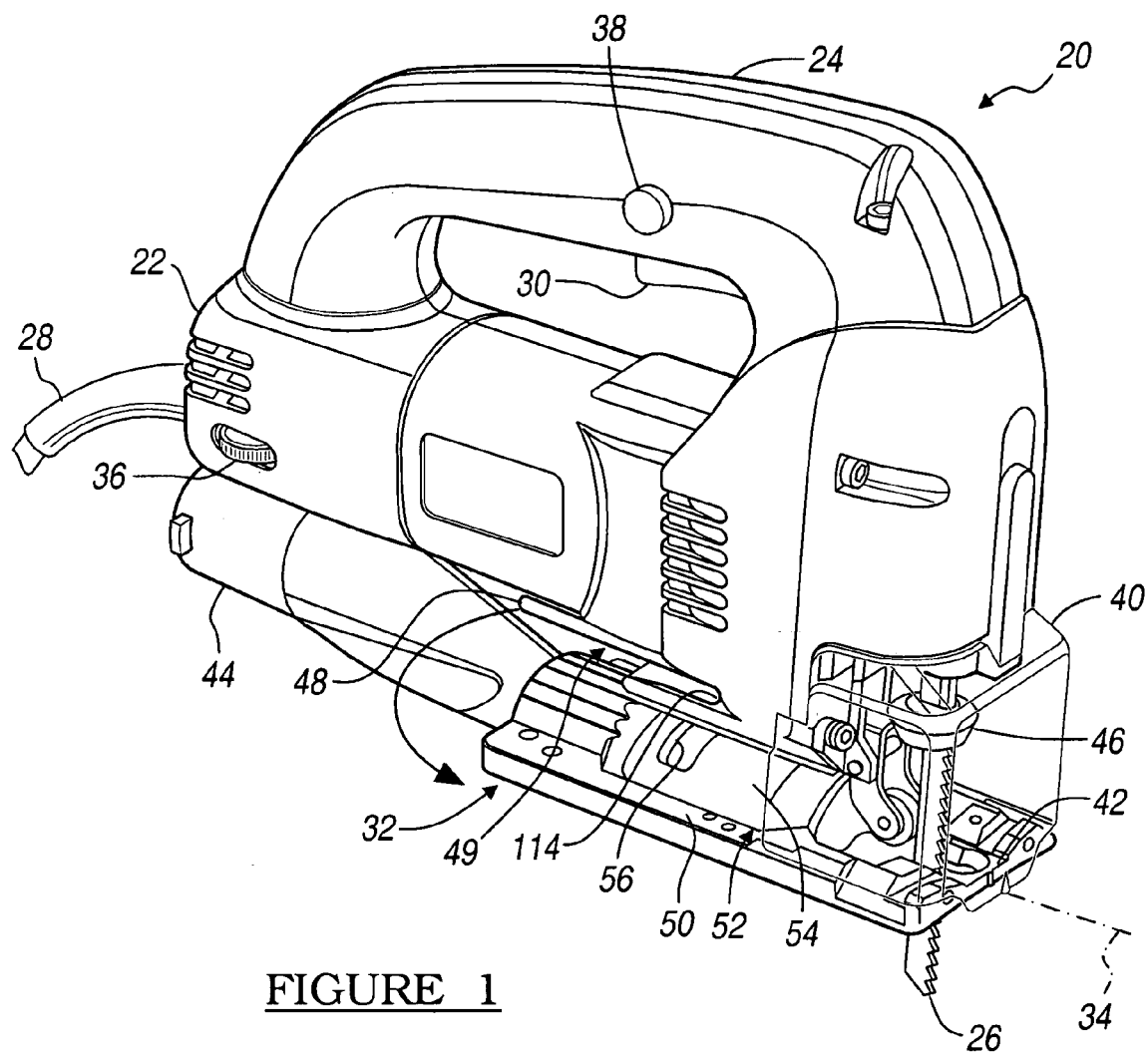
FIG. 1 is a side perspective view of a portable power tool having an adjustable base in accordance with the present invention, the adjustable base being illustrated in a locked position.
Figure 2:
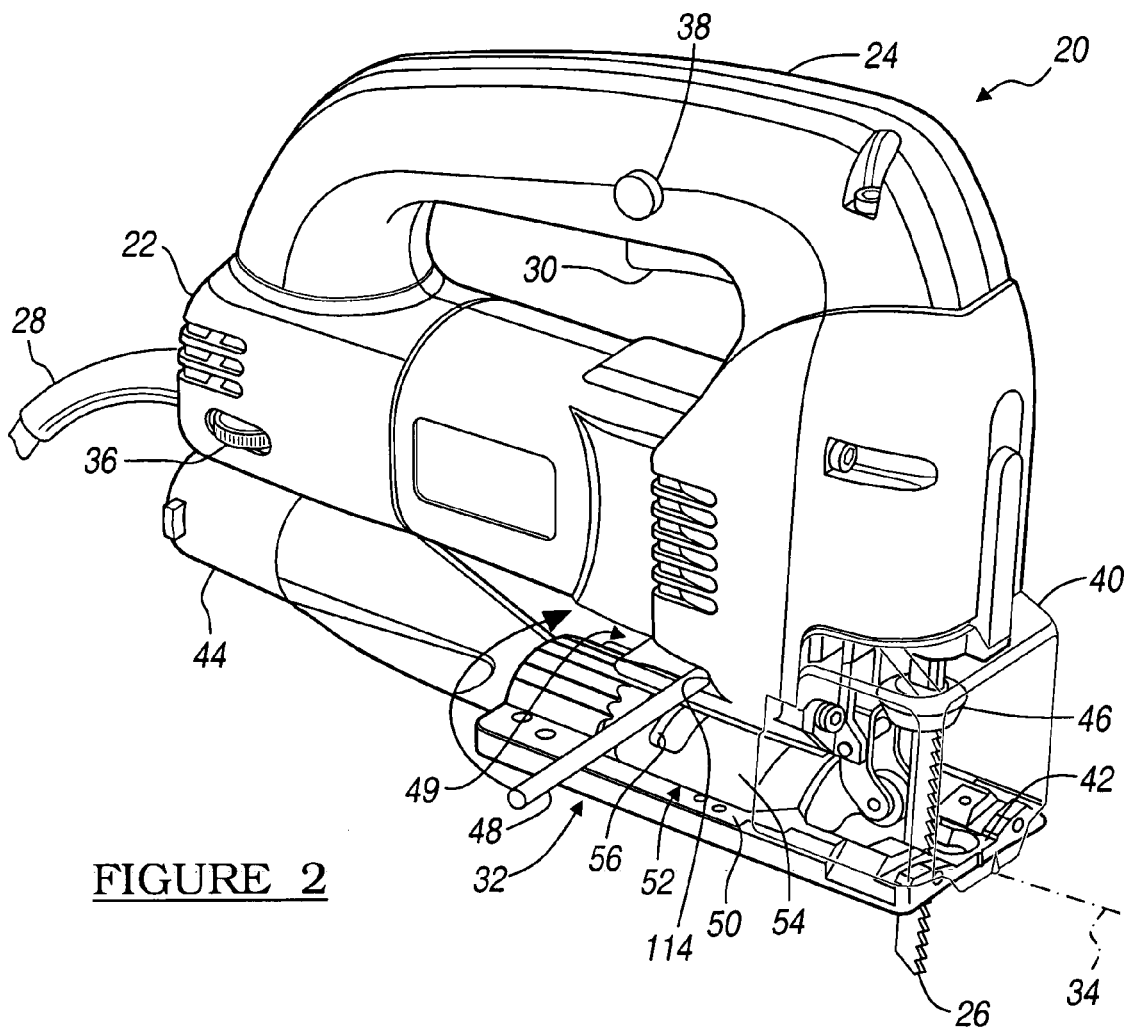
FIG. 2 is a perspective view of the portable power tool of FIG. 1, the adjustable base being illustrated in an unlocked position.

Referring to FIGS. 1 and 2, a preferred embodiment portable power tool is illustrated in accordance with the present invention, commonly referred to as a reciprocating saw, particularly a jigsaw 20. The jigsaw 20 includes a housing 22, and a handle 24 affixed to the housing. Specifically, a D-handle is illustrated, however the invention contemplates any handle, such as a barrel handle that may be formed as part of the housing that encloses a motor and operating mechanism of the saw. A motor (not shown) is disposed in the housing 22 for providing rotary motion to an operating mechanism (not shown) that converts the rotary motion to reciprocal motion for driving a saw blade 26 in a reciprocating or orbital-reciprocating motion, which is well known in the art. A power source 28 is provided to the jigsaw 20 which is controlled by trigger switch 30 for selectively imparting the reciprocating motion to the saw blade 26.

The jigsaw 20 is a portable saw and is commonly used by placing the jigsaw 20 on a workpiece during the cutting operation. Accordingly, the jigsaw 20 includes a base, particularly an adjustable base 32 that is affixed to the housing 22 for guiding the jigsaw 20 along an underlying support surface, such as the workpiece or an associated guide, and the adjustable base 32 is utilized for supporting the jigsaw 20 during the cutting operation. The adjustable base 32 has a longitudinal axis 34 about which the adjustable base 32 can be pivoted relative to the housing 22. The longitudinal axis 34 is generally parallel with a cutting plane defined by the saw blade 26. In the preferred embodiment, the longitudinal axis 34 lies in the cutting plane defined by the saw blade 26. The adjustable base 32 may be locked and unlocked for providing the adjustment of the base 32 relative to the housing 22. This adjustment permits a user to select a desired angle of the cutting plane relative to a surface of a workpiece (not shown) to which the adjustable base 32 engages during the cutting operation. This angular adjustment of the cutting plane relative to the adjustable base 32 is commonly referred to as a bevel angle.

The preferred embodiment jigsaw 20 also includes a variable speed control selector 36 for adjusting the speed of the reciprocating action. The jigsaw 20 includes a lock-on button 38 for allowing continuous operation without requiring constant depression of the trigger switch 30. A translucent chip shield 40 is provided that mounts to the adjustable base 32 and the housing 22. The chip shield 40 allows a user to view the cutting operation, while concomitantly limiting chips from obscuring the path of the jigsaw 20. The chip shield 40 is not adjustable and therefore may only be utilized for a bevel angle of zero degrees from vertical. The adjustable base 32 also includes a splinter guard 42 for minimizing splinters caused by the saw blade 26 during the cutting operation. A vacuum attachment 44 is illustrated mounted to a rearward region of the adjustable base 32. The vacuum attachment 44 is provided to secure a vacuum hose to the rearward end thereof for providing a negative pressure for moving dust and chips from the area of the cutting operation through the adjustable base 32. A toolless blade change mechanism 46 is provided mounted to the reciprocating mechanism of the jigsaw 20 for providing rapid change of saw blades 26 and for maximizing convenience provided to the user.

The adjustable base 32 includes a lever 48 pivotally mounted to the housing 22 about an axis that is perpendicular to the longitudinal axis 34 of the adjustable base 32. The lever 48 operates a clamping mechanism 49 of the adjustable base 32 to lock the adjustable base 32 relative to the housing 22 as illustrated in FIG. 1. As the lever 48 is pivoted in the direction of the arrow in FIG. 1, the lever 48 reaches an unlock position of the adjustable base 32 as illustrated in FIG. 2.

The adjustable base 32 includes a base frame 50. The base frame 50 includes a longitudinal shell 52 that has a generally arcuate cross section with an outer region 54 that is secured to the housing 22. The longitudinal shell 52 is parallel with the longitudinal axis 34. The longitudinal shell 52 includes a transverse slot 56 formed therethrough for receiving a portion of the clamping mechanism 49 therethrough and providing adjustability along the length of the transverse slot 56. Accordingly, as the lever 48 is pivoted to the unlock orientation, the adjustable base 32 is permitted to pivot about the longitudinal axis 34 due to the clearance of the clamping mechanism 49 provided in the transverse slot 56.

Figure 3:
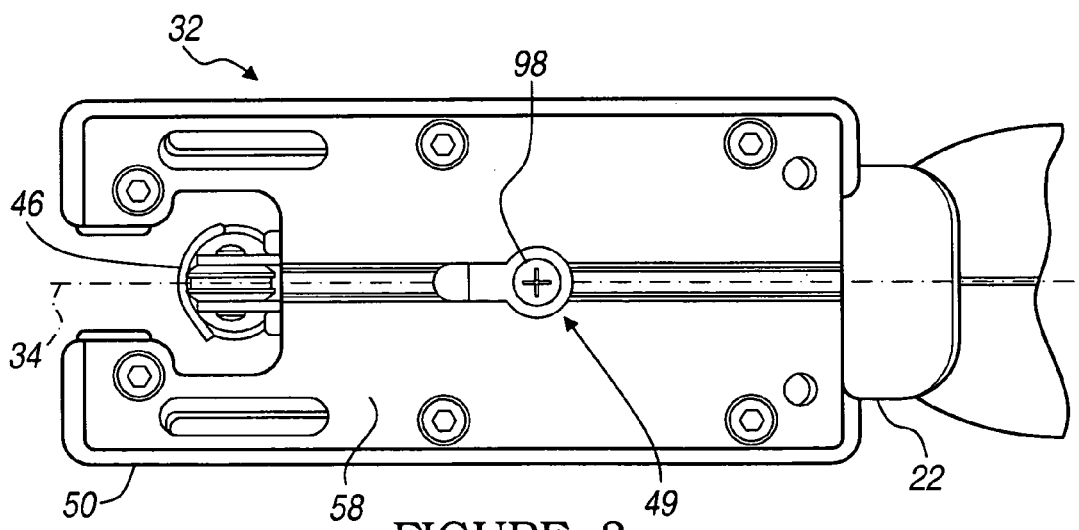
FIG. 3 is a bottom plan view of the adjustable base of the portable power tool of FIG. 1.

Referring now to FIG. 3, the base frame 50 includes a baseplate 58 fastened to the base frame 50. The baseplate 58 includes a generally planar contact surface that is spaced away from the housing 22 further than the base frame 50 and the associated fasteners are recessed within the baseplate 58 so that the baseplate 58 provides an area of contact against the workpiece for supporting the saw thereon and providing smooth sliding of the jigsaw 20 upon the associated support surface or workpiece. The baseplate 58 is formed of a high strength polymer material to avoid marring an associated surface of a workpiece. The baseplate 58 is removable from the base frame 50 so that the baseplate 58 may be replaced if damaged or wear is incurred.

Figure 4:
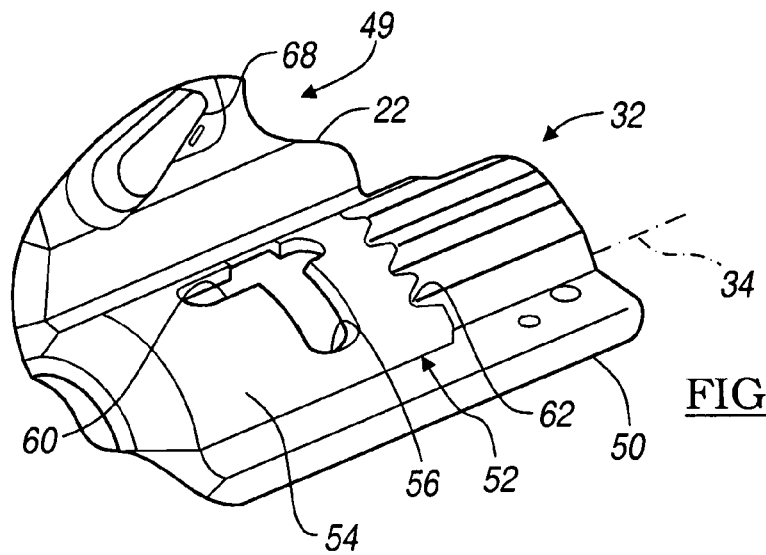
FIG. 4 is an enlarged partial perspective view of the adjustable base of FIG. 1.

Referring now to FIG. 4, the longitudinal shell 52 of the base frame 50 is illustrated enlarged with greater detail. The housing 22 is illustrated partially at a bevel angle offset from vertical. The longitudinal shell 52 includes a longitudinal slot 60 formed therein for permitting longitudinal adjustment of the adjustable base 32 relative to the housing 22 at the bevel angle of the saw that is zero degrees from vertical.

Figure 5:
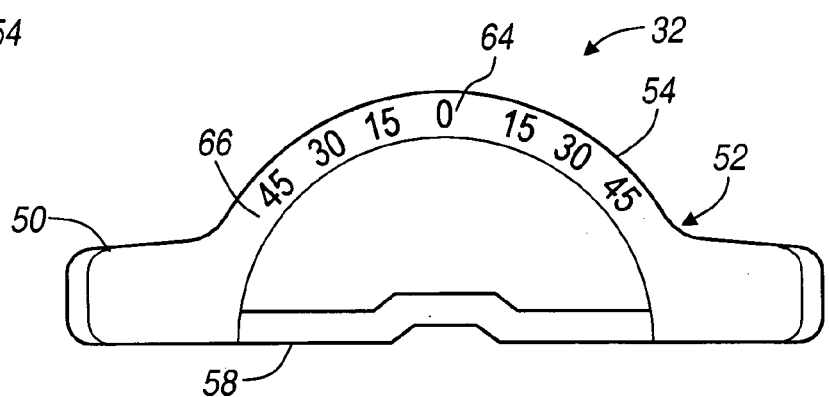
FIG. 5 is a rear side elevation view of the adjustable base of FIG. 1.

The longitudinal shell 52 includes a series of detents 62 formed therein. The detents correspond to fifteen degree increments of bevel angle adjustment relative to vertical. A series of indicia 64 illustrate the numerical value of these increments and are formed on a rear surface 66 of the base frame 50 as illustrated in FIG. 5. The detents 62 cooperate with a spring loaded tab (not shown) extending downwardly from the housing 22. The detents 62 provide quick adjustment of the bevel angle for certain predefined increments relative to vertical. Of course, various angles within this range are permitted, however require use of a protractor to ensure accurate adjustment.

Referring again to FIG. 4, the preferred embodiment jigsaw 20 also includes an orbital adjustment knob 68 extending from the housing for permitting a user to adjust the orbital motion of the cutting blade 26.

Figure 6:
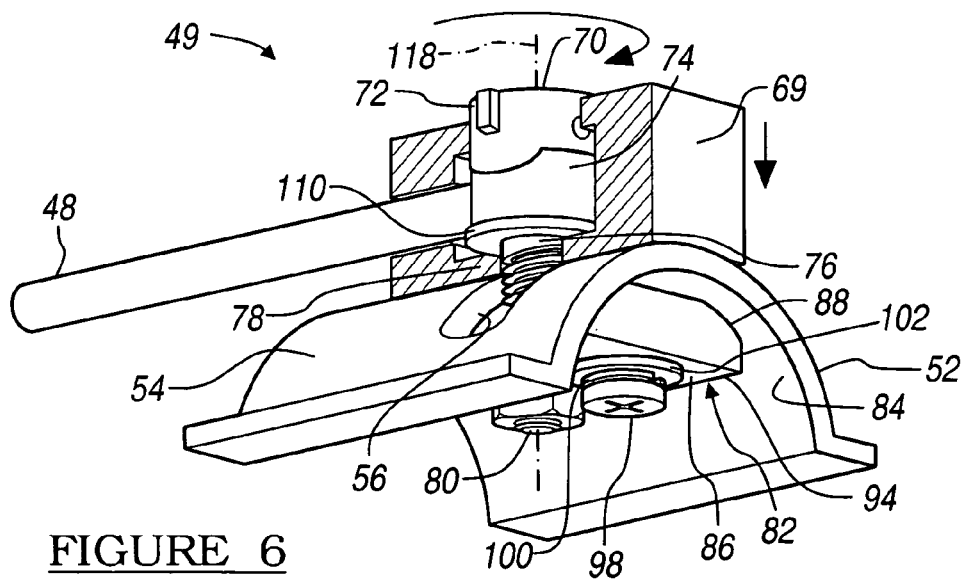
FIG. 6 is a partial perspective view of a clamping mechanism of the adjustable base of FIG. 1.

Referring now to FIGS. 6 and 7, the clamping mechanism 49 of the adjustable base 32 is illustrated in greater detail. In order to illustrate the clamping mechanism 49 of the adjustable base 32, a lower-most portion 69 of the housing 22 is depicted partially and in cross section in FIGS. 6 and 7. Additionally, the base frame 50 is illustrated partially by the longitudinal shell 52. A stationary collar 70 is secured to the housing 22. The stationary collar 70 includes a pair of lugs 72 mounted thereon for interlocking with the housing 22 and maintaining the orientation of the stationary collar 70 relative to the housing 22. The lever 48 is mounted to a rotary collar 74 so that manual rotation imparted to the lever 48 imparts the rotation to the rotary collar 74. The rotary collar 74 is mounted to a shaft 76 so that the rotary motion imparted to the lever 48 consequently rotates the collar 74 and the shaft 76. The rotary collar 74 is mounted within the housing 22 between stationary collar 70 and a wall portion 78 of the housing portion 69. Accordingly, the lever 48, rotary collar 74 and shaft 76 are secured to the housing 22 between the stationary collar 70 and the wall portion 78.

The shaft 76 includes a distal threaded end 80 that extends through the transverse slot 56 of the longitudinal shell 52. The preferred embodiment threaded end 80 has a diameter of 5 mm and a right handed pitch of 0.8 mm. The shaft threaded end 80 is threadably engaged to a longitudinal clamp member 82. The longitudinal clamp member 82 is received within an inner region 84 of the longitudinal shell 52. The clamp member 82 includes a longitudinal clamp block 86 that is sized to be received within the shell inner region 84. Specifically, the clamp block has a width that is sized so that the shell inner region 84 can pivot about the clamp block 86. The clamp block 86 includes lateral rounded edges 88 to provide an area of contact within the shell inner region 84. The clamp block 86 has a longitudinal length that is sufficiently long relative to its width for minimizing rotation of the clamp block 86 and clamp member 82 within the shell inner region 84.

The clamp block 86 includes an aperture 90 formed therethrough so that the threaded end 80 of the shaft 76 may be received therein. The clamp member 82 includes a hexagonal nut 92 for threadably engaging the shaft threaded end 80. The clamp block 86 includes a step 94 with a threaded aperture 96 formed therethrough. The threaded aperture 96 receives a screw 98. The screw 98 mounts to the step 94 with a lock washer 100 and flat washer 102 secured therebetween. The nut 92 includes an annular flange 104 extending therefrom. The step 94 is sized to space the flat washer 102 above the flange 104. The flat washer 102 has an external diameter sufficiently sized so that it engages one of the flat surfaces of the hexagonal nut 92. The flat washer 102 is secured to the clamp block 86 by the fastener 98 and lock washer 100, and maintains the nut 92 against the clamp block 86 by overlapping the flange 104. The flat washer 102 also prevents the nut 92 from being rotated relative to the clamp block 86.

The rotary collar 74 includes a first cam surface 106 formed on an axial face thereof, facing the stationary collar 70. The stationary collar 70 includes a second cam surface 108 formed on an axial face thereof corresponding to the first cam surface 106 and facing the first cam surface 106. A spring washer 110 is oriented about the shaft 76 and engages the rotary collar 74 and the wall portion 78 for biasing the rotary collar 74 away from the wall portion 78 and into engagement with the stationary collar 70 to maintain engagement of the first and second cam surfaces 106, 108.

Further, the shaft 76 is journalled within the stationary collar 70 to provide bearing support to the shaft 76 and rotary collar 74. Referring now to FIG. 9, the spring washer 110 is illustrated in cross section. The spring washer 110 has a generally frusto-conical cross section and may be compressed axially due to loads imparted on opposed axial surfaces thereof.

Referring now to FIGS. 6-8, the locking mechanism of the adjustable base is illustrated with the lever 48 in the locked orientation in FIG. 6 and the lever 48 in the unlocked orientation in FIG. 8. As the lever 48 is rotated from the locked position to the unlocked position in the direction of the rotary directional arrow in FIG. 6, the engaged cam surfaces 106, 108 cause the rotary collar 74 to shift generally away from the housing 22 in the direction that is indicated by the downward arrow in FIG. 6. As the rotary collar 74 is rotated and shifted downwards, the spring washer 110 becomes compressed permitting the axial translation of the rotary collars 74. As the rotary collar 74 is axially translated, the lever 48, shaft 76 and clamp member 82 are all displaced the dimension between the high peak and low peak of the engaged cam surfaces. Additionally, due to the rotation of the shaft 76, the clamp member 82 extends along the threaded end 80 of the shaft 76, even further away from the housing 22. Accordingly, mere rotation of the rotary collar 74 provides twice the mechanical advantage of displacement due to the displacement caused by the engaged cam surfaces 106, 108 and the threaded engagement of the shaft 76 and the clamp member 82. This improved mechanical advantage is advantageous because it minimizes the amount of rotary displacement required to the lever 48 thereby enhancing the compactness of the portable jigsaw 20. Further, the improved mechanical advantage requires the user to merely rotate the lever 48 a quarter turn (ninety degrees), rather than requiring the user to provide multiple or continuous rotations to the lever 48.

As the adjustable base 32 is returned to the locked orientation, the lever 48 is rotated in the lock direction as depicted by the rotary direction arrow in FIG. 8. As the lever 48 and rotary collar 74 are rotated, the high peaks of the rotary collar cam surface 106 engage corresponding low peaks in the stationary collar cam surface 108, thereby permitting the rotary collar 74 to be shifted in the upward direction, towards the housing 22 as depicted by the arrow in FIG. 8, by the spring washer 110. Therefore, as the lever 48 is rotated in the lock direction, the lever 48, rotary collar 74, shaft 76 and clamp member 82 are all shifted upwards, towards the housing 22 as permitted by the engaged cam surfaces 106, 108. Further, due to the threaded engagement of the shaft 76 and the clamp member 82, the clamp member 82 is further translated along the shaft threaded end 80 towards the housing 22. Due to the combined translation provided by the cam surfaces and the threadably engaged components, enough translation is provided to both loosen the threaded engagement and provide clearance for adjustment of the shell 52 about the clamp block 86. Further, the combination of the cam surface engagement and threadable engagement provides enough translation that the clearance is overcome and the base shell 52 is clamped between the clamp block 86 and the housing 22. Rather than just providing and eliminating clearance for the adjustment, the improved mechanical advantage provides enough translation so that the clamp block 86 and shell 52 experience a compressive load against the housing portion 69 thereby locking it relative to the housing portion 69.

The screw 98, lock washer 100 and flat washer 102 maintain the orientation of the nut 92 relative to the clamp block 86. However, the clamp block 86 may experience wear and fatigue over time, which may lessen the clamping effect and therefore may require adjustment of the nut 92. Accordingly, the screw 98 may be loosened until the washer 102 no longer engages a side surface of the hexagonal nut 92. Then, the nut 92 may be rotated to another flat side thereof, which are incrementally spaced radially at thirty degrees for a conventional hexagonal nut. After rotation of the nut 92 relative to the clamp block 86, the screw 98 may be retightened relative to the clamp block 86 so that the flat washer 102 maintains the new orientation of the nut 92. Referring again to FIG. 3, the baseplate 58 provides clearance for a screw driver to reach the screw 98. The nut 92 may be rotated manually by reaching within the backside of the shell inner region 84, or the baseplate 58 may be removed altogether to assist in this operation.

To reduce the manufacturing costs of providing stationary and rotary collars 70, 74, the collars 70, 74 are each formed from an investment casting process. Alternatively, the collars 70, 74 may be formed from a powder metal compressing and sintering process, of the like. Further, the rotary collar 74 and lever 48 may be formed integrally by one of these manufacturing processes.

Referring to FIG. 7, the housing 22 includes a first radial stop surface 112 for providing a limit to the range of rotation of the lever 48. Referring again to FIGS. 1 and 2, the housing 22 also includes a second radial stop surface 112 for providing a second limit to the range of rotation of the lever 48.

Figure 10:
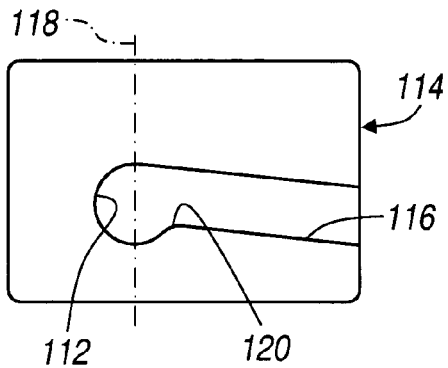
FIG. 10 is a rear side elevation view of a housing of an alternative embodiment adjustable base.

With reference now to FIG. 10, an alternative embodiment housing portion 114 is illustrated in accordance with the teachings of the present invention. Rather than requiring a biasing member such as the spring washer 110 of the prior embodiment, the housing portion 114 includes an inclined slot 116 formed therein for receiving the manual lever 48. The inclined slot 116 terminates at the radial stop surface 112 so that as the lever 48 is rotated, the inclined slot 116 urges the lever 48 in a direction towards the stationary collar 70. Accordingly, as the lever 48 is urged so are the rotary collar 74, shaft 76 and clamp member 82 in a direction that maintains the engagement of the first cam surface 106 to the second cam surface 108. Since the inclined slot extends radially inwards towards a central axis 118 of the shaft 76, the inclined slot 116 forms a partial helix formed in the housing 114. A projection 120 may be formed within the inclined slot 116 to maintain the lever 48 in the locked position, when it rests against the radial stop surface 112.

Figure 11:
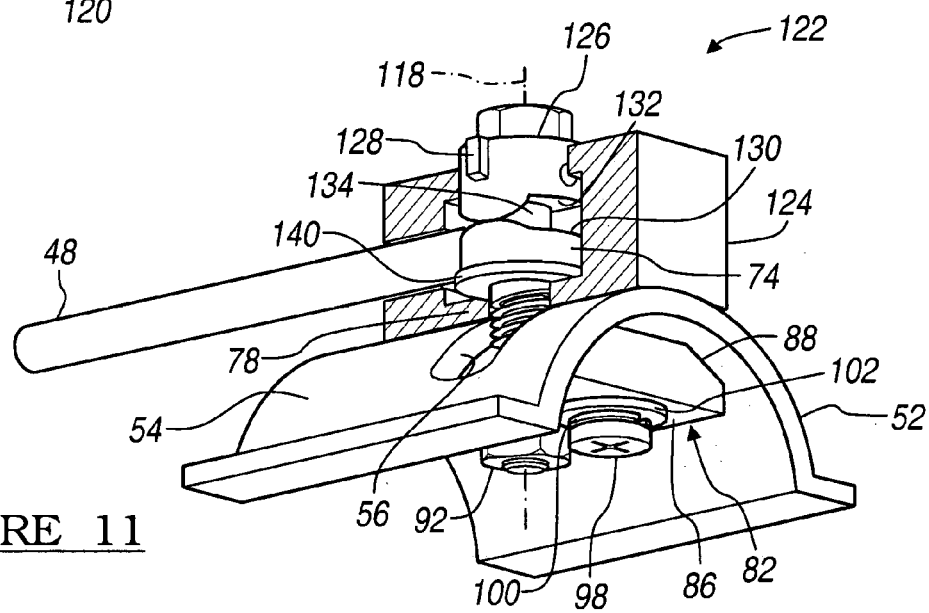
FIG. 11 is a partial perspective view of an alternative embodiment adjustable base clamping mechanism in accordance with the present invention, illustrated in a locked position.
Figure 12:
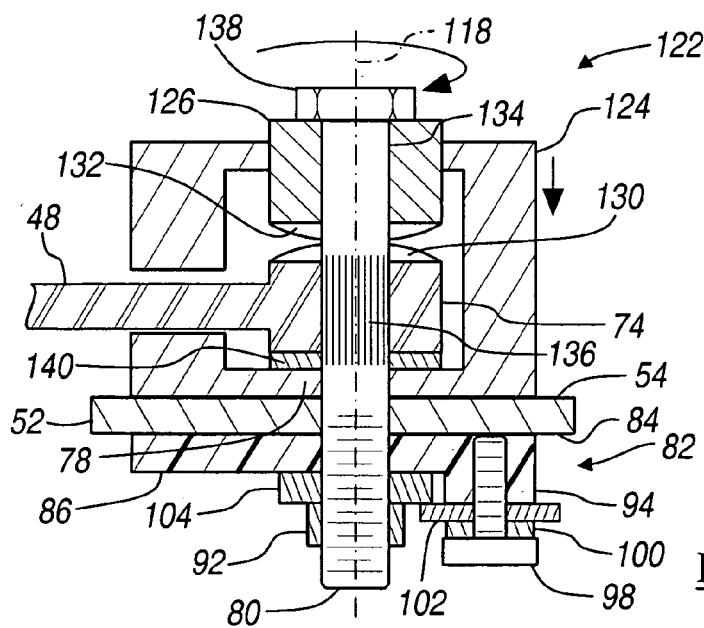
FIG. 12 is a side partial section view of the clamping mechanism of FIG. 11.

Referring now to FIGS. 11 and 12, an alternative embodiment clamping mechanism 122 is illustrated in accordance with the present invention. Same or similar elements retain same reference numerals wherein new elements are assigned new reference numerals. The clamping mechanism 122 includes a lower housing portion 124 with a shiftable collar 126 mounted therein. The shiftable collar 126 includes a pair of lugs 128 that cooperate with the housing 124 to prevent the shiftable collar 126 from rotating relative to the housing 124 while permitting the shiftable collar 126 to be shifted axially relative to the housing 124. The clamping mechanism 122 is operated by a lever 48 extending from a rotary collar 74. The rotary collar 74 includes a first cam surface 130 for engagement with a second cam surface 132 of the shiftable collar 126. In comparison to the prior embodiment, one of the first and second cam surfaces 130, 132 is shifted radially ninety degrees. Specifically, the first cam surface 130 is offset radially ninety degrees from the prior embodiment.

The clamping mechanism 122 includes a shaft 134 having a splined region 136 that is engaged within a corresponding splined region within the rotary collar 74 so that the shaft 134 is coupled for rotation with the rotary collar 74, however the shaft 134 is free to translate axially relative to the rotary collar 74. The shaft 134 includes a threaded distal end 80 threadably received within the nut 92 of the clamp member 82. The shaft 134 also includes a hexagonal bolt head 138 formed thereon for retaining the shiftable collar 126 axially in the direction of the clamp member 82.

Referring specifically to FIG. 12, the clamping mechanism 122 is illustrated in the locked position. As the lever 48 is rotated away from the housing as illustrated by the rotary directional arrow in FIG. 12, the lever 48, rotary collar 74 and shaft 134 are rotated approximately ninety degrees. Due to this rotation, the high peaks of the first cam surface 130 are no longer aligned with the high peaks of the second cam surface 132 thereby permitting the shiftable collar 126 to translate downwards in the direction of the downward arrow in FIG. 12 and consequently permitting the shaft 134 and clamp member 82 to shift downwards, thus unclamping the shell region 52 from between the clamp member 82 and the housing 124. Additionally, due to this rotation, the clamp member 82 is advanced further away from the housing along the threaded end 80 of the shaft 134.

Once a desired bevel angle is selected, the shell region 52 of the base frame 50 is resecured to the housing 124 by rotating the lever 48 back to the lock position in FIG. 12. Accordingly, the cooperating cam surfaces force the shiftable collar 126 upwards and towards the housing 22. As the shiftable collar 126 is urged upward, the bolt head 138 of the shaft 134 is shifted upward, thus shifting the clamp member 82 towards the housing 22. As the shaft 134 is rotated, the clamp member 82 extends axially along the threaded end 80 of the shaft 134, thus clamping the shell region 52 between the clamp block 86 and the housing lower portion 124.

Since the cooperating cam surfaces 130, 132 are engaged at a high peak to high peak orientation in the lock position, a biasing member is no longer needed and therefore, merely a flat washer 140 is provided between the rotary collar 74 and the wall portion 78 of the housing. However, this high peak to high peak engagement of the first cam surface 130 and the second cam surface 132 may not be desired because it merely provides a line contact between the rotary collar 74 and the shiftable collar 126 in the loaded position of the locking mechanism 122. In contrast, the preferred embodiment locking mechanism provides an area contact in the locked position as illustrated in FIG. 6 and a line contact in the unlocked position is illustrated in FIG. 8. Since it may be desired to provide an area of contact in the locked position, in order to stabilize the adjustable base and evenly distribute the compressive load, the area contact is preferred.

Figure 13:
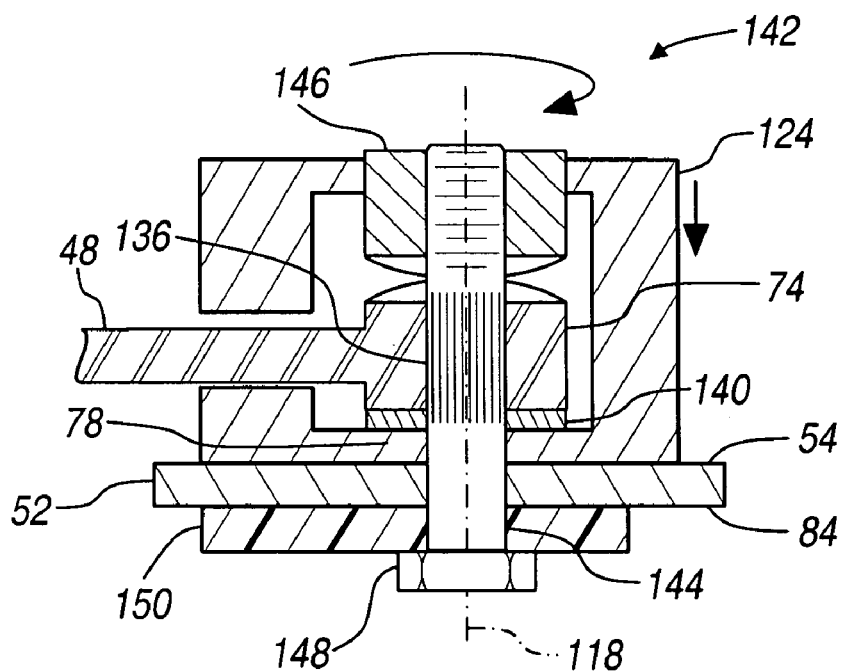
FIG. 13 is a side partial section view of another alternative embodiment adjustable base clamping mechanism in accordance with the present invention, illustrated in a locked position.

Referring now to FIG. 13, another alternative embodiment clamping mechanism 142 is illustrated in accordance with the teachings of the present invention. The clamping mechanism 142 is similar to the clamping mechanism 122 in FIGS. 11 and 12, however the clamping mechanism 142 includes a shaft 144 that is threadably engaged into a shiftable collar 146 and includes a hexagonal bolt head 148 for retaining a clamp block 150 axially. As the lever 48 and rotary collar 74 are rotated in the direction of the rotary direction arrow in FIG. 13, to the unlocked position, the rotary collar 74 rotates the shaft 144 as well due to the spline region 136 of the shaft. As the first cam surface 130 is rotated to the unlocked direction, the shiftable collar 146 is permitted to translate axially downward as indicated by the downward arrow in FIG. 13. Accordingly, the shaft 144 and bolt head 148 may be translated axially downward for providing clearance between the clamp block 50 and shell region 52 and the housing 124. Further, as the shaft 144 is rotated relative to the shiftable collar 146, the threaded engagement therebetween causes the shaft 144 to extend axially away from the housing 22 thereby providing further clearance for unclamping the shell region 52.

As the lever 48 is returned to the lock position, the rotary collar 74 shifts the shiftable collar 146 towards the housing 22, thus shifting the shaft 144, hexagonal bolt head 148 and clamp block 150 against the shell region 52 and towards the housing 124. Further, due to the threaded end 80 of the shaft 144 being threadably engaged within the shiftable collar 146, the shaft 144 is urged further towards the housing 124, thus enhancing the clamping characteristics of the clamping mechanism 142. The alternative embodiment clamping mechanism 142 is not preferred because it provides no method of adjusting the threaded engagement of the threaded end 80 of the shaft 144 relative to the component in which it is received, specifically the shiftable collar 146. Unlike the prior embodiments, the clamping mechanism 142 does not provide adjustment to overcome wear or fatigue experienced by the clamp block 150 or the other associated clamping elements such as the shell region 52 or the housing 124. Further, the alternative embodiment clamping mechanism 142 may be more difficult to assemble than the prior embodiments.

Figure 14:
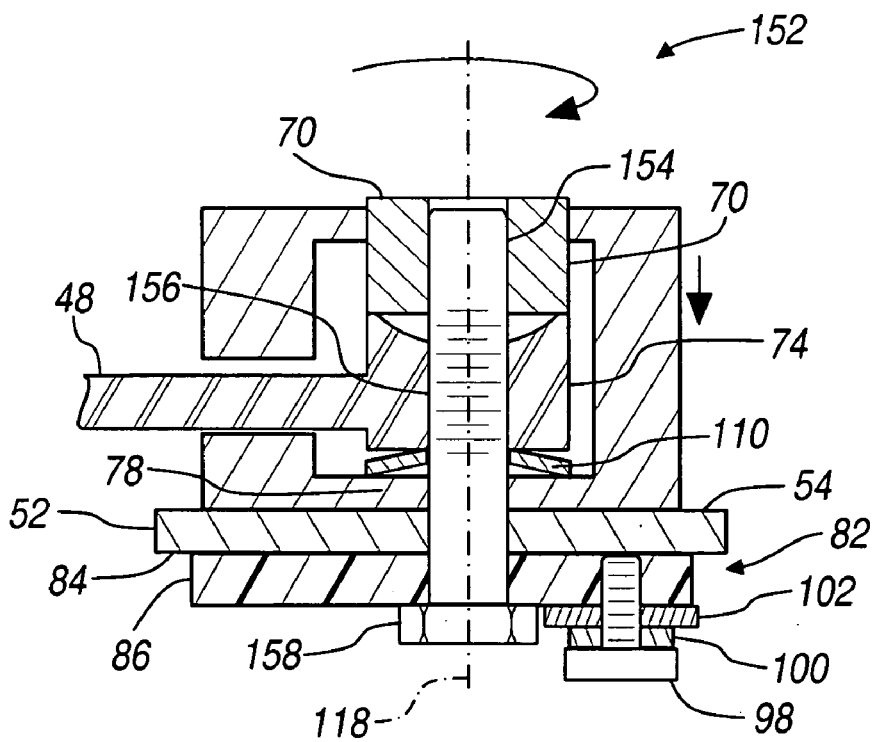
FIG. 14 is a side partial section view of yet another alternative embodiment adjustable base clamping mechanism in accordance with the present invention, illustrated in a locked position.

Referring now to FIG. 14, another alternative embodiment clamping mechanism 152 is illustrated in accordance with the teachings of the present invention. The clamping mechanism 152 includes a stationary collar 70 secured to the housing lower region 22. The lever 48 is utilized for rotating the rotary collar 74. A shaft 154 is journaled within the stationary collar 70 and includes an intermediate threaded region 156 that is threadably engaged within the rotary collar 74. The shaft 154 further includes a hexagonal bolt head 158 formed at a distal end thereof for retaining the clamp member 82 axially. The clamp member 82 includes the screw 98, lock washer 100 and flat washer 102 for mounting the lock washer 100 against a flat surface of the hexagonal bolt head 158 for preventing rotation of the shaft 154 relative to the clamp member 82.

The clamping mechanism 152 is unlocked by rotating the lever 48 and consequently the rotary collar 74 to the unlocked direction as depicted by the rotary direction arrow in FIG. 14. Due to the engaged cam surfaces 106, 108 of the rotary collar 74 and stationary collar 70, the rotary collar 74 is urged downwards as depicted by the downward extending arrow in FIG. 14, thus compressing the spring washer 110. As the rotary collar 74 is shifted downwards, the shaft 154 is shifted downwards thereby permitting the clamp member 82 to be translated axially from the housing 22 for unclamping the shell member 52 disposed between the clamp member 82 and the housing. Further, due to the threaded engagement of the shaft 154 and the rotary collar 74, the shaft 154 is further extended axially away from the housing relative to the rotary collar 74 thereby enhancing the mechanical advantage of the quarter turn of the lever 48 and rotary collar 74. As the lever 48 is returned to the locked position, the spring washer 110 urges the rotary collar 74 towards the housing and into full engagement of the rotary collar cam surface 106 with the second cam surface 108 of the stationary collar 70. Accordingly, the shaft 154 and clamp member 182 are shifted towards the housing as well. Further, due to the threaded engagement of the shaft 154 and the rotary collar 74, the shaft 154 is further translated axially toward the housing 22, thus enhancing the clamping engagement of the shell region 52 between the clamp member 82 and the housing portion 124.

Accordingly, the teachings of the present invention provide an improved mechanical advantage to a user for adjusting a base of a portable saw relative to the cutting plane for providing various bevel angles, while minimizing the efforts required by the user.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable saw having a housing, a handle affixed to the housing, a motor oriented in the housing, a saw blade operably driven by the motor for performing a cutting operation, and an adjustable base affixed to the housing for permitting selective adjustment of the base relative to the housing, the adjustable base comprising:
   a longitudinal shell having a generally arcuate cross section with an outer region secured to the housing and an inner region facing away from the housing, the shell having a longitudinal axis generally parallel with a cutting plane of the saw blade, the shell having a transverse slot formed therethrough;
   a baseplate affixed to the shell, the baseplate having a generally planar contact surface spaced apart and opposed from the housing for engaging a workpiece and supporting the saw thereon;
   a shaft mounted to the housing for limited rotary and axial movement relative thereto, the shaft having a distal end extending from the housing, through the transverse slot and into the shell inner region;
   a collar operably connected to the shaft, the collar having a first cam surface cooperating with a corresponding second cam surface that is rotationally fixed for limited axial translation relative to the housing,
   a lever mounted to the collar and rotatable around an axis extending perpendicular to the longitudinal axis so that rotation of the collar in an unlock direction extends the distal end of the shaft away from the housing, and rotation of the shaft in a lock direction retracts the distal end of the shaft towards the housing; and
   a longitudinal clamp member received within the shell inner region and cooperating with the shaft distal end for clamping the shell to the housing, the clamp member being sized so that the shell inner region can pivot about the clamp member as the transverse slot provides clearance for the shaft;
   wherein the shaft is threadably engaged to at least one of the collar, the housing or the clamp member so that rotation of the collar in the unlock direction either extends the shaft further away from the housing or extends the clamp member along the shaft away from the housing, and rotation of the collar in the lock direction either retracts the shaft towards the housing or retracts the clamp member along the shaft towards the housing thereby permitting the shell to be loosened and secured relative to the housing as the shaft is rotated in the lock and unlock directions respectively.

2. The portable saw of claim 1 wherein the portable saw is a reciprocating saw.

3. The portable saw of claim 1 wherein the portable saw is a jigsaw.

4. The portable saw of claim 1 wherein the second cam surface is fixed relative to the housing, the collar is fixed to the shaft, and the shaft distal end is threadably engaged to the clamp member so that rotation of the collar in the unlock direction translates the collar, shaft and clamp member axially away from the housing due to the cooperating cam surfaces of the collar and the housing, and the clamp member translates along the shaft away from the housing due to the threaded cooperation of the shaft and clamp member; and wherein rotation of the collar in the lock direction translates the collar, shaft and clamp member axially towards the housing due to the cooperating cam surfaces of the collar and the housing, and the clamp member translates along the shaft toward the housing due to the threaded cooperation of the shaft and clamp member.

5. The portable saw of claim 1 wherein the second cam surface is fixed relative to the housing, the shaft is threadably engaged within the collar, and the shaft distal end is rotationally fixed to the clamp member so that rotation of the collar in the unlock direction translates the collar, shaft and clamp member axially away from the housing due to the cooperating cam surfaces of the collar and the housing, and the shaft and clamp member extend from the collar away from the housing due to the threaded cooperation of the shaft and collar; and wherein rotation of the collar in the lock direction translates the collar, shaft and clamp member axially towards the housing due to the cooperating cam surfaces of the collar and the housing, and the shaft and clamp member retract to the collar towards the housing due to the threaded cooperation of the shaft and collar.

6. The portable saw of claim 1 further comprising a biasing member for urging the cam surfaces into engagement.

7. The portable saw of claim 6 wherein the biasing member is a spring washer.

8. The portable saw of claim 1 wherein the lever and collar are formed integrally.

9. The portable saw of claim 1 wherein the housing provides limits to the range of rotation of the lever.

10. The portable saw of claim 1 wherein the housing includes a slot for receiving the lever as it is rotated, the slot being inclined towards the second cam surface in the lock direction to urge the collar first cam surface and the second cam surface into engagement.

11. The portable saw of claim 1 further comprising a second collar mounted to the housing, the second collar including the second cam surface formed thereon.

12. The portable saw of claim 11 wherein the shaft is journalled within the second collar.

13. The portable saw of claim 11 wherein the second collar is rotationally fixed for limited axial translation relative to the housing.

14. The portable saw of claim 13 wherein the first collar is fixed for rotation with the shaft, the shaft is threadably engaged with one of the second collar and the clamp member and the shaft axially restrains the other of the second collar and the clamp member towards the first collar in the locked orientation of the adjustable base.

15. The portable saw of claim 14 wherein the shaft is threadably engaged with the clamp member and the shaft axially restrains the second collar towards the first collar in the locked orientation of the adjustable base so that rotation of the first collar in the unlock direction permits translation of the second collar, shaft and clamp member axially away from the housing due to the cooperating cam surfaces of the first and second collars, and the clamp member extends along the shaft away from the housing due to the threaded cooperation of the shaft and the clamp member; and wherein the rotation of the collar in the lock direction translates the second collar, shaft and clamp member axially towards the housing due to the cooperating cam surfaces of the first and second collars, and the clamp member retracts along the shaft towards the housing due to the threaded cooperation of the shaft and the clamp member.

16. The portable saw of claim 14 wherein the shaft is threadably engaged with the second collar and the shaft axially restrains the clamp member towards the first collar in the locked orientation of the adjustable base so that rotation of the first collar in the unlock direction permits translation of the second collar, shaft and clamp member axially away from the housing due to the cooperating cam surfaces of the first and second collars, and the shaft and clamp member extend from the second collar away from the housing due to the threaded cooperation of the shaft and the second collar; and wherein the rotation of the collar in the lock direction translates the second collar, shaft and clamp member axially towards the housing due to the cooperating cam surfaces of the first and second collars, and the shaft and clamp member retract to the second collar towards the housing due to the threaded cooperation of the shaft and the second collar.

17. An adjustable base for a portable saw having a housing, a handle affixed to the housing, a motor oriented in the housing, and a saw blade operably driven by the motor for performing a cutting operation, the adjustable base comprising:

a longitudinal shell having a generally arcuate cross section with an outer region secured to the housing and an inner region facing away from the housing, the shell having a longitudinal axis generally parallel with a cutting plane of the saw blade, the shell having a transverse slot formed therethrough;

a baseplate affixed to the shell, the baseplate having a generally planar contact surface spaced apart and opposed from the housing for engaging a workpiece and supporting the saw thereon;

a shaft mounted to the housing for limited rotary and axial movement relative thereto, the shaft having a distal end extending from the housing, through the transverse slot and into the shell inner region;

a first collar fixed for rotation with the shaft, the first collar having a first cam surface cooperating with a second cam surface provided on a second collar that is rotationally fixed for axial translation relative to the housing, a lever mounted to the first collar and rotatable around an axis extending perpendicular to the longaudinal axis so that rotation of the collar in an unlock direction extends the distal end of the shaft away from the housing, and rotation of the shaft in a lock direction retracts the distal end of the shaft towards the housing; and a longitudinal clamp member received within the shell inner region and cooperating with the shaft distal end for clamping the shell to the housing, the clamp member being sized so that the shell inner region can pivot about the clamp member as the transverse slot provides clearance for the shaft;

wherein the shaft is threadably engaged to at least one of the second collar and the clamp member and the shaft axially restrains the other of the second collar and clamp member towards the first collar in the locked orientation so that rotation of the collar in the unlock direction either extends the shaft further away from the housing or extends the clamp member along the shaft away from the housing, and rotation of the collar in the lock direction either retracts the shaft towards the housing or retracts the clamp member along the shaft towards the housing thereby permitting the shell to be loosened for adjustment and secured relative to the housing as the shaft is rotated in the lock and unlock directions respectively.

18. A portable saw having a housing, a handle affixed to the housing, a motor oriented in the housing, a saw blade operably driven by the motor for performing a cutting operation, and an adjustable base affixed to the housing for permitting selective adjustment of the base relative to the housing, the adjustable base comprising:

a longitudinal shell having a generally arcuate cross section with an outer region secured to the housing and an inner region facing away from the housing, the shell having a longitudinal axis generally parallel with a cutting plane of the saw blade, the shell having a transverse slot formed therethrough;

a baseplate affixed to the shell, the baseplate having a generally planar contact surface spaced apart and opposed from the housing for engaging a workpiece and supporting the saw thereon;

a shaft mounted to the housing for limited rotary and axial movement relative thereto, the shaft having a threaded distal end extending from the housing, through the transverse slot and into the shell inner region;

a first collar mounted to the shaft, the first collar having a first cam surface cooperating with a corresponding second cam surface provided on a second collar that is rotationally fixed for axial translation relative to the housing, a lever mounted to the first collar and rotatable around an axis extending perpendicular to the longitudinal axis so that rotation of the shaft in an unlock direction extends the distal end of the shaft away from the housing, and rotation of the shaft in a lock direction retracts the distal end of the shaft towards the housing; and a longitudinal clamp member received within the shell inner region and threadably engaged with the shaft distal end for clamping the shell to the housing, the clamp member being sized so that the shell inner region can pivot about the clamp member as the transverse slot provides clearance for the shaft wherein the shaft is threadably engaged to at least one of the second collar and the clamp member and the shaft axially restrains the other of the second collar and clamp member towards the first collar in the locked orientation so that rotation of the shaft in the unlock direction extends the clamp member along the shaft further away from the housing, and rotation of the shaft in the lock direction retracts the clamp member along the shaft towards the housing thereby permitting the shell to be loosened and secured relative to the housing as the shaft is rotated in the lock and unlock directions respectively.

19. A portable saw having a housing, a handle affixed to the housing, a motor oriented in the housing, a saw blade operably driven by the motor for performing a cutting operation, and an adjustable base affixed to the housing for permitting selective adjustment of the base relative to the housing, the adjustable base comprising:

a longitudinal shell having a generally arcuate cross section with an outer region secured to the housing and an inner region facing away from the housing, the shell having a longitudinal axis generally parallel with a cutting plane of the saw blade, the shell having a transverse slot formed therethrough;

a baseplate affixed to the shell, the baseplate having a generally planar contact surface spaced apart and opposed from the housing for engaging a workpiece and supporting the saw thereon;

a shaft mounted to the housing for limited rotary and axial movement relative thereto, the shaft having a distal end extending from the housing, through the transverse slot and into the shell inner region;

a first collar rotationally connected to the shaft, the first collar having a first cam surface cooperating with a corresponding second cam surface that is rotationally fixed relative to the housing, a second collar mounted to the housing such that it is rotationally fixed for limited translation relative to the housing, the second collar having a second cam surface a manual lever mounted to the first collar and extending radially therefrom so that rotation of the lever in an unlock direction extends the distal end of the shaft away from the housing, and rotation of the lever in a lock direction retracts the distal end of the shaft towards the housing, wherein rotation is in an axis extending perpendicular to the longitudinal axis and a rotation range of the lever is limited by the housing; and, a longitudinal clamp member received within the shell inner region and cooperating with the shaft distal end for clamping the shell to the housing, the clamp member being sized so that the shell inner region can pivot about the clamp member as the transverse slot provides clearance for the shaft;

wherein the shaft is threadably engaged to at least one of the second collar and the clamp member so that rotation of the lever in the unlock direction either extends the shaft further away from the housing or extends the clamp member along the shaft away from the housing, and rotation of the lever in the lock direction either retracts the shaft towards the housing or retracts the clamp member along the shaft towards the housing such that the shaft axially restrains the other of the second collar and the clamp member towards the first collar in the locked orientation of the adjustable base, thereby permitting the shell to be loosened and secured relative to the housing as the lever is rotated in the lock and unlock directions respectively.

* * * * *